United States Patent [19]

Abo

[11] Patent Number: 4,729,758
[45] Date of Patent: Mar. 8, 1988

[54] TRANSMISSION BELT PROVIDED WITH PUSH ELEMENTS

[75] Inventor: Keiju Abo, Yokosuka, Japan

[73] Assignee: Nissan Motor Co., Ltd., Yokohama, Japan

[21] Appl. No.: 916,096

[22] Filed: Oct. 7, 1986

[30] Foreign Application Priority Data

Oct. 8, 1985 [JP] Japan .................................. 60-222740

[51] Int. Cl.[4] .............................................. F16G 5/16
[52] U.S. Cl. .................................... 474/242; 474/201
[58] Field of Search ............... 474/242, 201, 240, 245, 474/246

[56] References Cited

U.S. PATENT DOCUMENTS

| 3,949,621 | 4/1976 | Beusink et al. | 474/242 X |
| 4,080,841 | 3/1978 | Vollers | 474/201 |
| 4,303,403 | 12/1981 | Lamers | 474/201 |
| 4,498,892 | 2/1985 | Huntley | 474/201 X |
| 4,525,159 | 6/1985 | Filderman et al. | 474/242 X |
| 4,619,634 | 10/1986 | Nakawaki | 474/242 X |

FOREIGN PATENT DOCUMENTS 57-23820  5/1982  Japan .

Primary Examiner—Stephen J. Novosad
Assistant Examiner—Thuy M. Bui
Attorney, Agent, or Firm—Schwartz, Jeffery, Schwaab, Mack, Blumenthal & Evans

[57] ABSTRACT

A transmission belt is disclosed wherein a plurality of push elements are arranged on a carrier such that a difference in radial distance of guide surface between the adjacent two push elements is not greater than a predetermined value in order to keep the push elements into contact with an inner surface of the carrier.

8 Claims, 6 Drawing Figures

TRANSMISSION BELT PROVIDED WITH PUSH ELEMENTS

BACKGROUND OF THE INVENTION

The present invention relates to a transmission belt including a plurality of push elements slidably arranged on a carrier, the carrier comprising, for example, one or two belt packets, and the push elements arranged one behind another in the longitudinal direction thereof. Such a transmission belt is described, for example, in U.S. Pat. No. 4,080,841 and No. 4,303,403.

A transmission belt provided with such push elements can be used for transmitting a relatively large torque between two V-shaped pulleys in which the spacing between V-shaped pulley groove defining walls can be varied to provide a continuously variable transmission ratio. In such an arrangement, the torque is transmitted using a pushing force, which is transmitted by the array of push elements.

In such a transmission belt, each push element has an outwardly facing guide surface that comes into contact with an inner surface of the carrier and two side faces which cooperate with the V-shaped pulley groove defining walls.

U.S. Pat. No. 4,080,841 (corresponding to Published Japanese patent application No. 57-23820) discloses a transmission belt which comprises a carrier made of two metallic belt packets and a plurality of push elements arranged on the carrier. The push elements are tapered inwardly in cross-section, which facilitates their running around the pulleys. Since the radial distances of the outwardly facing guide surfaces of the push elements that are arranged on the transmission belt around a V-shaped pulley from the center axis of the pulley vary due to manufaturing error, the carrier is subject to stress concentration a portion or portions where the guide surface of one push element is elevated, and thus the carrier is apt to be cracked at such portion or portions in use for a long period of time.

The problem of this known transmission belt is described in detail with reference to FIG. 6. FIG. 6 shows push elements arranged on the portion of the transmission belt 49 around a pulley 54, with a push element 50a which has its guide surface elevated beyond a circular plane defined by the guide surfaces of the other push elements. The carrier 52 is pushed outwardly by the push element 50a and separated from push elements 50b and 50c disposed adjacent to the push element 50a. In FIG. 6, only that portion of each push element 50a, 50b, 50c, etc. which is disposed radially inward of the carrier 52 is shown. In the case where it is pushed outwardly by the particular push element 50a and given local stress concentration, the carrier 52 is apt to crack, resulting in a short operating life. This problem is attributed to the fact that the radial distances of the guide surfaces of the push elements vary and this variation cannot be decreased satisfactorily by current manufacturing engineering techniques.

The present invention solves the problem mentioned above.

SUMMARY OF THE INVENTION

The above mentioned problem is solved by a transmission belt comprising a plurality of push elements which are arranged on a carrier, wherein an outwardly facing guide surface of each push element assumes a position determined in reference to two side faces thereof, and the difference between the position of the guide surface of each push element and that of the guide surface of an adjacent push element is not greater than a predetermined value in order to keep the push elements which fill the entire length of the transmission belt in contact with an inner surface of the carrier.

DETAILED DESCRIPTION OF THE INVENTION

Figure 1:
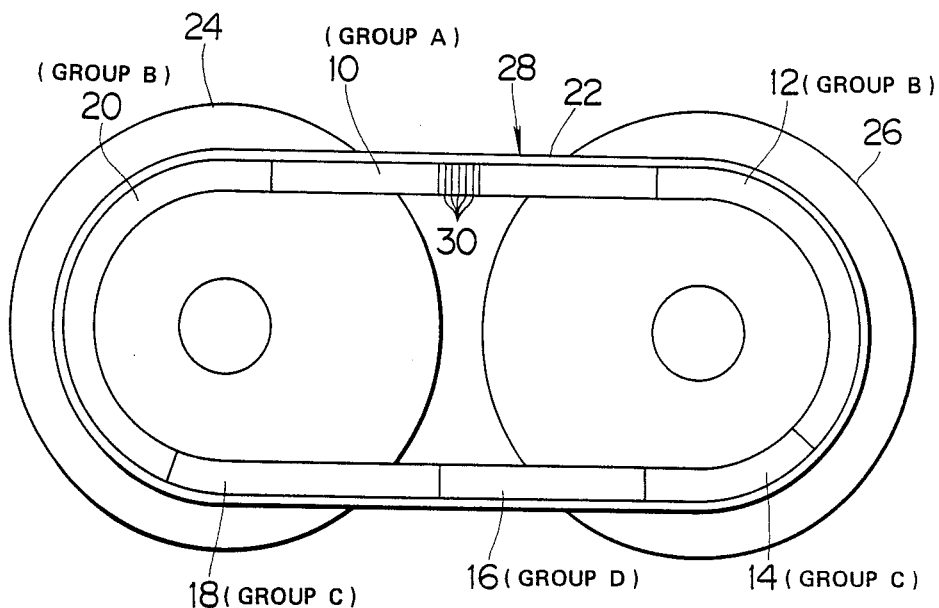
FIG. 1 is a diagrammatic sectional elevation of two pulleys with an embodiment of a transmission belt according to the present invention.

Referring to FIG. 1, two V-shaped pulleys 24, 26 and a transmission belt 28 tensioned about them are shown. The diameters of the portions of belt 28 rounding the pulleys 24, 26 can be varied by controlling the spacing between the V-shaped pulley defining walls of the pulleys. In this way, the ratio between the speeds of rotation of pulleys 24, 26 is continuously variable.

The transmission belt 28 comprises a plurality of push elements 30 slidably arranged on a carrier 22 made of two metallic belt packets, each packet being in the form of laminated thin metallic belts. The push elements 30 are slightly tapered inwardly in cross section, which facilitates their running around the pulleys 24, 26. The number of push elements 30 on the carrier 22 is such that they are in contact with each other and fill up the entire belt.

In use, the tension of the carrier must be greater than the maximum pushing power transmitted by the push elements 30 to prevent sagging of the straight portions of the belt.

The push elements 30 filling up the entire length of the belt 28 are made of six segments 10, 12, 14, 16, 18, and 20. Segment 10 consists of push elements selected from a GROUP A, segment 12 consists of push elements selected from a GROUP B, segment 14 consists of push elements selected from a GROUP C, segment 16 consists of push elements selected from a GROUP D, segment 18 consists of puch elements selected from the GROUP C, and segment 20 consists of push elements selected from the GROUP B.

Figure 2:
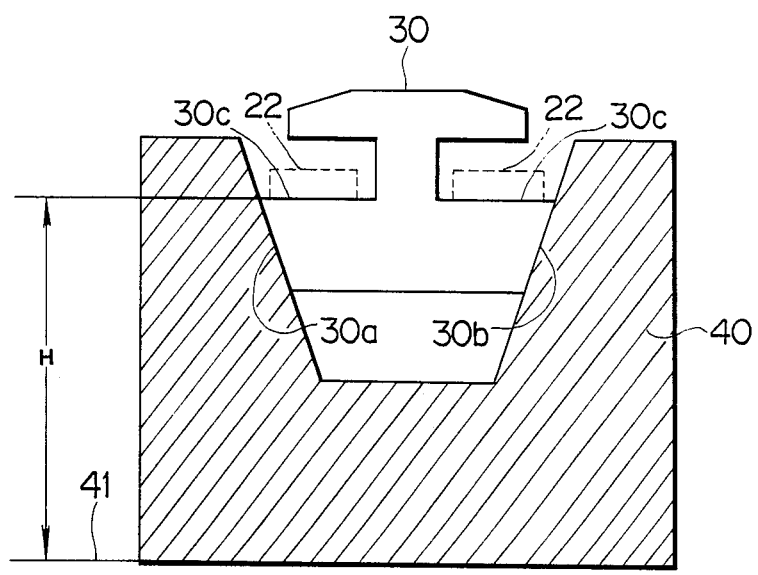
FIG. 2 illustrates a standard V-shaped pulley groove gauge with a push element under measurement.

The GROUPS A, B, C, and D designate groups into which push elements are divided based on the measurements carried out using a standard V-shaped pulley groove gauge 40 as shown in FIG. 2.

Figure 3:
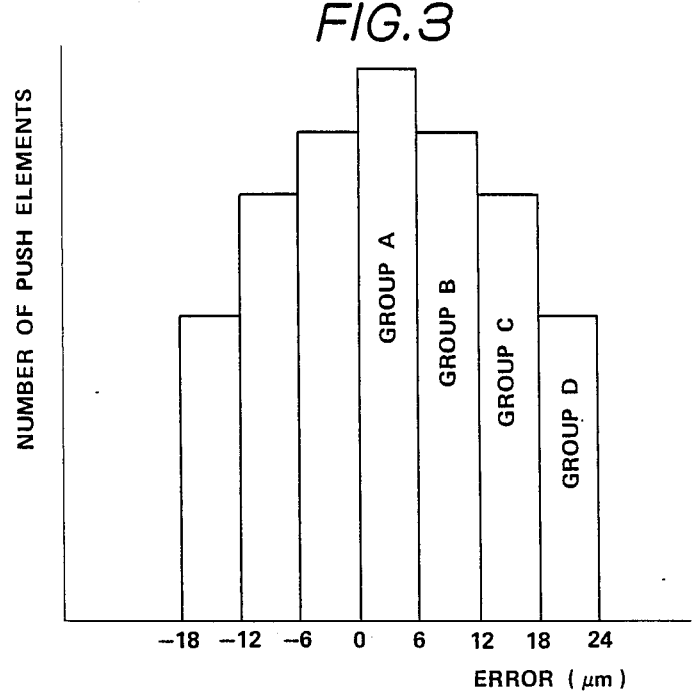
FIG. 3 is a bar graph of the dispersion of push elements classified into various groups in accordance with the result of measurement.

FIG. 2, shows a standard V-shaped pulley groove gauge 40 and a push element 30 having two side faces 30a, 30b designed to cooperate with V-shaped pulley groove defining walls, and being recessed to receive two belt packets 22, 22 as a carrier. Two outwardly facing guide surfaces 30c, 30c contact the inner surfaces of the belt packets 22, 22. The push element 30 has its side faces 30a, 30b in contact with the V-shaped pulley groove defining walls of the gauge 40 and the guide surfaces 22, 22 are a radial distance H from a standard line 41. As this standard line 41 is assumed to be a center axis of a V-shaped pulley, the radial distance H corresponds to a radius of a running diameter of the portion of a transmission belt around the pulley. Thus, the radial distance H is a dimension which indicates the position of the guide surfaces 30c, 30c determined in reference to the side faces 30a, 30b. The radial distance H is compared with a specified design value and an error value therebetween is calculated. According to the magnitude of this error value, the push element is classified into suitable one of GROUPS A, B, C, and D. The range of values in error to be covered by each group is computed on the radius of the running diameter of a transmission belt and the thickness of a push element as will be later described in detail. Assuming that the range is 6 $\mu$m (micrometers), the push elements are dispersed in a manner as shown by a bar graph in FIG. 3. The above mentioned GROUPS A, B, C, and D are illustrated by the corresponding bars in FIG. 3. If, as described later in detail, the range of values in error of each group is set equal to a predetermined value and push elements selected from one group and push elements selected from the adjacent group (for example, GROUPS A and B, GROUPS B and C, GROUPS C and D) as viewed in FIG. 3 are arranged on the carrier 22 to form the adjacent two segments as viewed in FIG. 1, a difference in the distance H between the adjacent two push elements arranged on the carrier 22 will not exceed the predetermined value. For example, if the range is 6 $\mu$m (micrometers) as mentioned above, the difference in the distance H between push elements belonging to the same segment does not exceed this range of 6 $\mu$m (micrometers), and the difference in the distance H between the adjacent two push elements belonging to the adjacent two segments, respectively, and disposed to define the boundaries of these segments does not exceed 12 $\mu$m (micrometers). Thus, the difference in the distance H between push elements arranged along the entire length of the transmission belt will not exceed the predetermined value of 12 $\mu$m (micrometers), whereby the push elements are kept in contact with the carrier. The manner of computing the predetermined value of 12 $\mu$m (micrometers) and the reason why the push elements are kept into contact with the carrier are hereinafter described.

Figure 4:
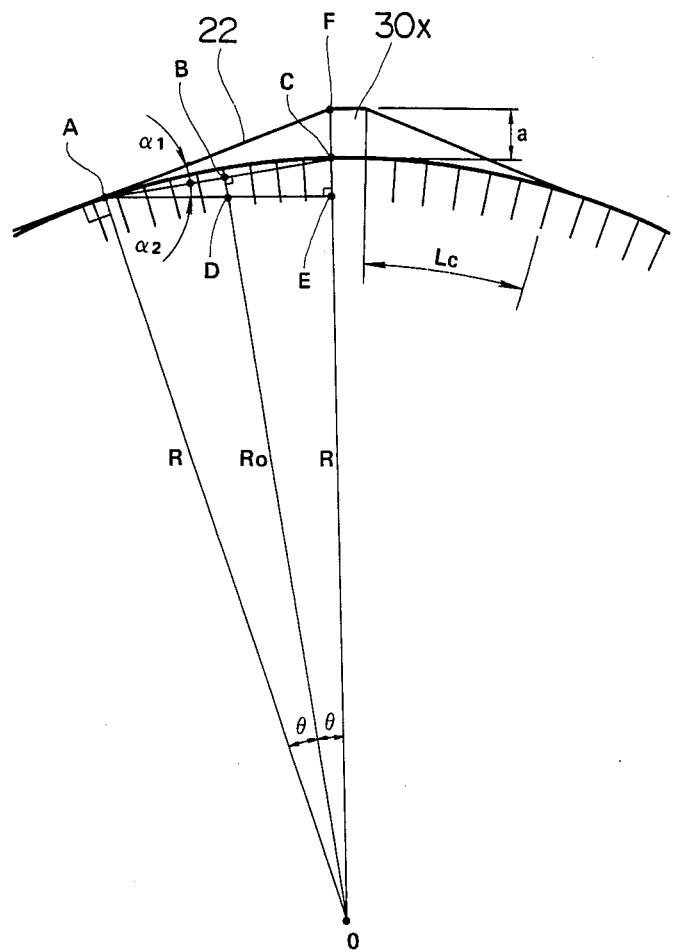
FIG. 4 is an illustration for understanding an equation which expresses the magnitude of elevation of the guide surface of a push element.
Figure 5:
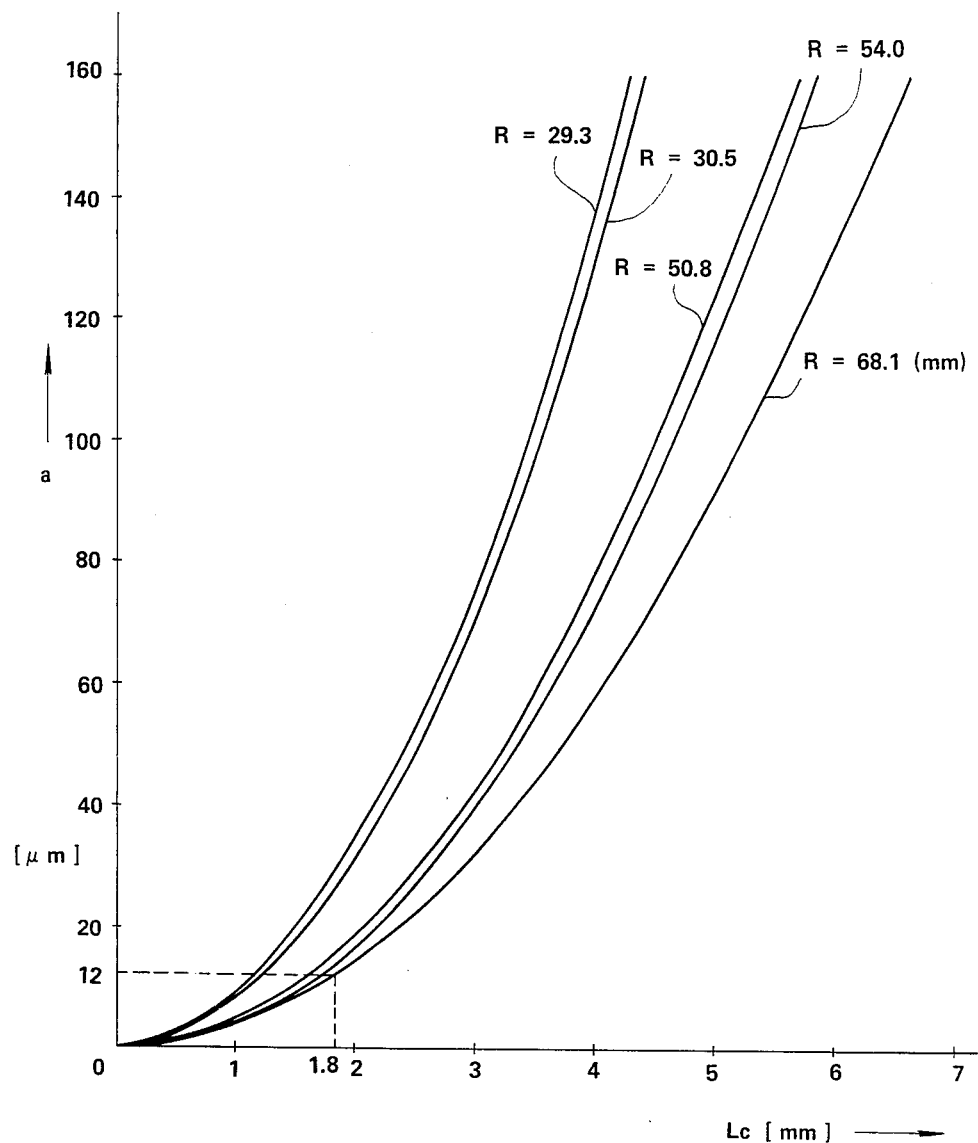
FIG. 5 is a graph showing the relationship among the magnitude of elevation of a push element (a), the length of the portion of a carrier which is out of contact with the array of push elements (Lc), and the radius of the running diameter of the belt (R)

Referring to FIG. 4, a specified push element 30x pushes a carrier 22 outwardly. The reference characters used in FIG. 4 are as follows:

a: the magnitude of elevation of push element 30x;
R: the radius of the running diameter of the carrier;
Lc: the circumferential length of the portion of the carrier which is out of contact with the array of push elements (corresponding to the length of a circular arc AC);
A: the lefthand end position of the portion of the carrier 22 which is out of contact with the array of push elements;
C: the position where the adjacent push element contacts with the lefthand end surface of the push element 30x;
B: the middle position of the line segment AC;
F: the position of the apex of the push element 30x;
O: the axis of the V-shaped pulley;
E: the point where the perpendicular line drawn from the point A intersects at right angles with the line segment OF;
D: the point where the line segment AE intersects with the line segment OB;
$\theta$: the angle AOB (=the angle FOB);
$\alpha_1$: the angle FAC;
$\alpha_2$: the angle CAE;
$R_0$: the radial distance between the points O and B.

Since the angles $\alpha_1$ and $\alpha_2$ are very small and negligible, the following relationships will hold:
$R_0 = R$
$AC = AE$ and
$\alpha_1 = \alpha_2 = \theta$.

From the geometric relationship as illustrated in FIG. 4, it may be assumed that the elevation a is equal to the length of a line segment FC of a triangle FCA. Since the length of a line segment AC can be expressed by $2R_0 \tan \theta$, $\tan \theta$ can be expressed by the following equation:

$$a/(2R_0 \cdot \tan \theta) = \tan \theta \qquad (1).$$

From the equation (1), $$a = 2R_0 \cdot (\tan \theta)^2$$
$$= 2R \cdot (\tan \theta)^2.$$

Thus, $$\tan \theta = a/2R$$
$$\theta = \tan^{-1} a/2R \qquad (2).$$

Since Lc is approximately equal to the arc AC, the following equation holds:

$$Lc = 2\pi R \cdot (2\theta/360) \qquad (3)$$
$$= \pi R \cdot \theta/90$$
$$= (\pi R/90) \cdot \theta$$

Substituting the equation (2) into the equation (3), $$Lc = (\pi R/90) \tan^{-1} a/(2R) \qquad (4).$$

From the equation (4), the elevation a can be expressed as follows:

$$\tan \frac{90Lc}{\pi R} = \sqrt{a/(2R)}.$$

Thus, $$a = 2R \cdot \left( \tan \frac{90Lc}{\pi R} \right)^2. \qquad (5)$$

From the above equation (5), it is obvious that the magnitude of elavation a is determined by Lc and R.

Figure 6:
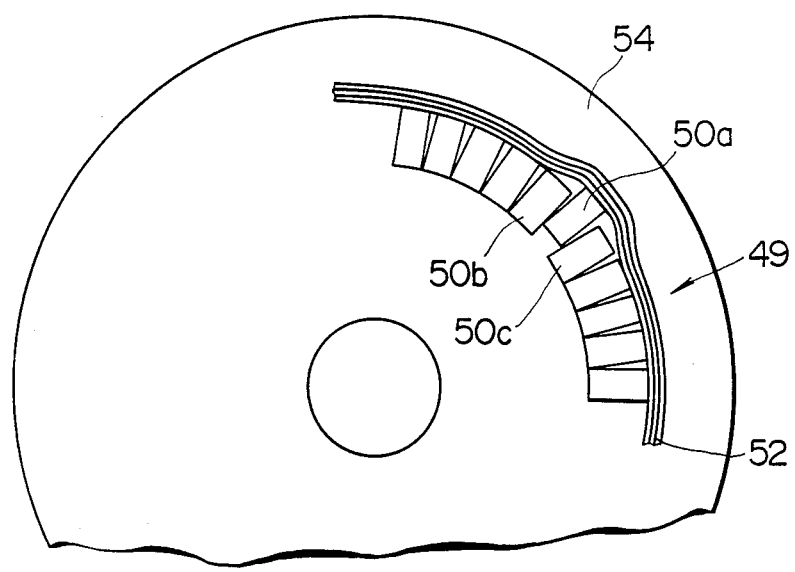
FIG. 6 is a diagrammatic sectional view of a portion of a transmission belt according to the prior art discussed before.

Thus, if the dimension Lc is set less than the thickness of each push element, the adjacent push element to the push element 30x is alway kept in contact with the carrier 22. FIG. 6 shows the variation of the value a against variations of the values R and Lc. For example, if the setting is such that Lc = 1.8 mm, and R = 68.1 mm, the value a becomes equal to 12 μm (micrometers). This means that if the thickness of each push element is equal to 1.8 mm, the value a should be set equal to 12 μm (micrometers) in order to keep the array of push elements in contact with the carrier. If this predetermined value a is to be set as equal to 12 μm (micrometers), the range of each group should be set as equal to a/b 2, i.e., 6 μm (micrometers), taking into account the maximum error in the distance H between the adjacent two push elements belonging to the adjacent two segments, respectively, and disposed to define the boundaries of these adjacent two segments.

What is claimed is:

1. A transmission belt for transmitting a torque between two pulleys, each pulley being adapted to rotate around an axis of rotation and having a V-shaped pulley groove and walls defining the V-shaped pulley groove, comprising:
   a carrier having an inner surface;
   a plurality of push elements slidably arranged on said carrier in face-to-face contacting relationship to fill substantially the entire length of the transmission belt, each push element having at least one outwardly facing guide surface that is adapted to contact said inner surface of said carrier, and two inclined side faces which are adapted to cooperate with the walls defining the V-shaped pulley groove, each of said push elements being adapted to successively come into engagement with the walls defining the V-shaped pulley groove,
   wherein each of said push elements has a predetermined dimension which is determined in reference to said side faces thereof, said predetermined dimension determining a radial distance of said guide surface of each push element from the axis of rotation of each pulley when said each push element comes into engagement with the walls defining the V-shaped pulley groove of the pulley, wherein the difference between said predetermined dimension of each push element and the predetermined dimension of any adjacent push element is not greater than a predetermined value such that said plurality of push elements are kept in contact with said inner surface of said carrier.

2. A transmission belt as claimed in claim 1, wherein said plurality of push elements are divided into a plurality of segments, each segment comprising push elements selected from a group consisting of push elements each having a predetermined dimension within a predetermined range, said predetermined range of each group being determined such that the difference in said predetermined dimensions between the adjacent two push elements belonging to each adjacent two segments which are disposed to define the boundaries of said adjacent two segments, does not exceed said predetermined value.

3. A transmission belt as claimed in claim 1, wherein said predetermined value is the value a which is expressed as;

$$a = 2R\left(\tan\frac{90Lc}{\pi R}\right)^2$$

where,
a: the predetermined value;
Lc: the thickness of each push element;
R: the radius of the running diameter of the carrier.

4. A transmission belt as claimed in claim 2, wherein said predetermined value is the value a/2, where the value a is expressed as;

$$a = 2R\left(\tan\frac{90Lc}{\pi R}\right)^2$$

where,
Lc: the thickness of each push element;
R: the radius of the running diameter of the carrier.

5. A transmission belt for transmitting a torque between two pulleys, each pulley being adapted to rotate around an axis of rotation and having walls defining a V-shaped pulley groove, comprising:
   a carrier moveable around the two pulleys and having an inner surface;
   a plurality of push elements slidably arranged on the carrier in face-to-face contacting relationship, the push elements being adapted to contact the pulley groove of each pulley as the carrier moves around the pulleys, each push element having an outwardly facing guide surface adapted to contact with the inner surface of the carrier and two inclined side faces adapted to contact the walls defining the pulley groove, the outwardly facing guide surface of each push element adapted to be at a given radial distance from the axis of rotation of each pulley as the push element engages the pulley groove of each respective pulley; and
   means for minimizing the difference between the radial distance of the guide surface of each push element with respect to the radial distance of the guide surface of adjoining push elements, comprising an arrangement of push elements on the carrier, each push element of the arrangement being identifiable by an error value indicating the deviation of the push element from a specified design value which corresponds to the preferred radial distance of the guide surface from the axis of rotation of each pulley and the push elements being positioned adjacent one another on the carrier such that the difference between the error values of adjoining push elements does not exceed a first predetermined value.

6. A transmission belt as claimed in claim 5 wherein the first predetermined value is expressed as:

$$a = 2R(\tan 90\ Lc/\pi R)^2$$

where
a: the predetermined value;
Lc: the thickness of each push element; and
R: the radius of the running diameter of the carrier.

7. A transmission belt for transmitting a torque between two pulleys, each pulley being adapted to rotate around an axis of rotation and having walls defining a V-shaped pulley groove, comprising:
   a carrier moveable around the two pulleys and having an inner surface;
   a plurality of push elements slidably arranged on the carrier in face-to-face contacting relationship, each push element being adapted to engage the walls defining the V-shaped pulley groove of each pulley as the carrier moves around the pulleys, each push element having an outwardly facing guide surface adapted to contact the inner surface of the carrier and two inclined side faces adapted to contact the walls of the V-shaped pulley groove of each pulley, the outwardly facing guide surface of each push element being adapted to be at a given radial distance from the axis of rotation of each respective pulley as the push element contacts the pulley groove of the respective pulley, each push element being identifiable by an error value indicating the deviation of the push element from a specified design value which corresponds to the preferred radial distance of the guide surface of the push element from the axis of rotation of each pulley as the push element contacts the pulley; and means for minimizing the difference between the radial distance of the guide surface of each push element and the radial distance of the guide surface of adjoining push elements, comprising a plurality of segments of push elements, each segment comprising a plurality of push elements having substantially the same error value and the segments being arranged adjacent one another along the carrier such that the difference between the error values of the push elements of each segment and the error values of the push elements of adjoining segments does not exceed a second predetermined value.

8. A transmission belt as claimed in claim 7 wherein the second predetermined value is the value $a/2$, where the value $a$ is expressed as:

$$a = 2R (\tan 90Lc/\pi R)^2$$

where
    $Lc$: the thickness of each push element; and
    $R$: the radius of the running diameter of the carrier.

* * * * *